United States Patent [19]
Bowles

[11] 3,722,061
[45] Mar. 27, 1973

[54] WIRE WRAP PIN POINTERNONE

[76] Inventor: Lowell Bowles, 2236 Hauser Blvd., Los Angeles, Calif. 90016

[22] Filed: Aug. 23, 1971

[21] Appl. No.: 173,913

[52] U.S. Cl. ...................................................29/203 B
[51] Int. Cl. ...............................................H05k 13/04
[58] Field of Search..29/203 B, 203 H, 203 R, 203 P, 29/206

[56] References Cited

UNITED STATES PATENTS

| 3,523,353 | 8/1970 | Drinkard et al. | 29/203 B |
| 3,327,374 | 6/1967 | Lulick et al. | 29/203 H |

*Primary Examiner*—Thomas H. Eager
*Attorney*—Flam and Flam

[57] ABSTRACT

An electromechanical pointer indicates the specific terminal board pin to which a wire is to be wrapped. The apparatus comprises a ruled reference carriage driven along one axis to align a carriage ruler edge with the terminal board row containing the specific pin. A plurality of illuminable optical pointers, each comprising a lamp and an optical guide, are spaced along the ruler edge. One or more of the optical pointers is illuminated to indicate the specific pin to be wrapped. A photo-optical vernier permits the optical pointer lamps also to control positioning of the carriage along the one axis. A tool sensing light beam cooperates with the carriage control mechanism to indicate that the wire wrap gun has been correctly positioned at the appointed pin.

24 Claims, 7 Drawing Figures

PATENTED MAR 27 1973 3,722,061

INVENTOR.
LOWELL E. BOWLES
BY
Flam and Flam
ATTORNEYS

LOWELL E. BOWLES
INVENTOR.

BY
Flam and Flam
ATTORNEYS

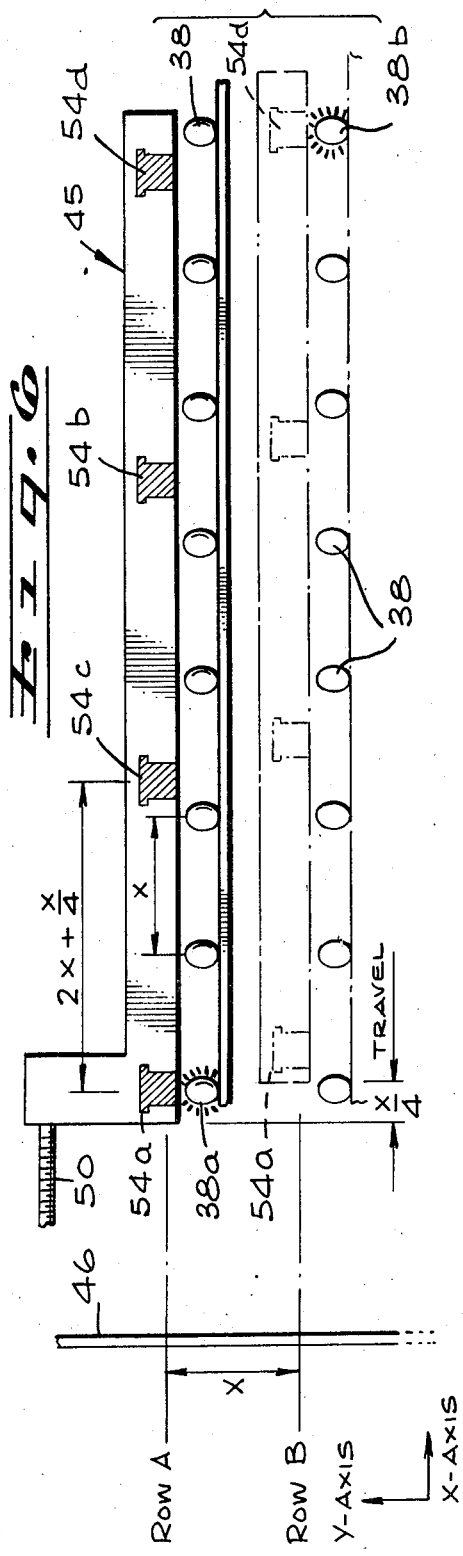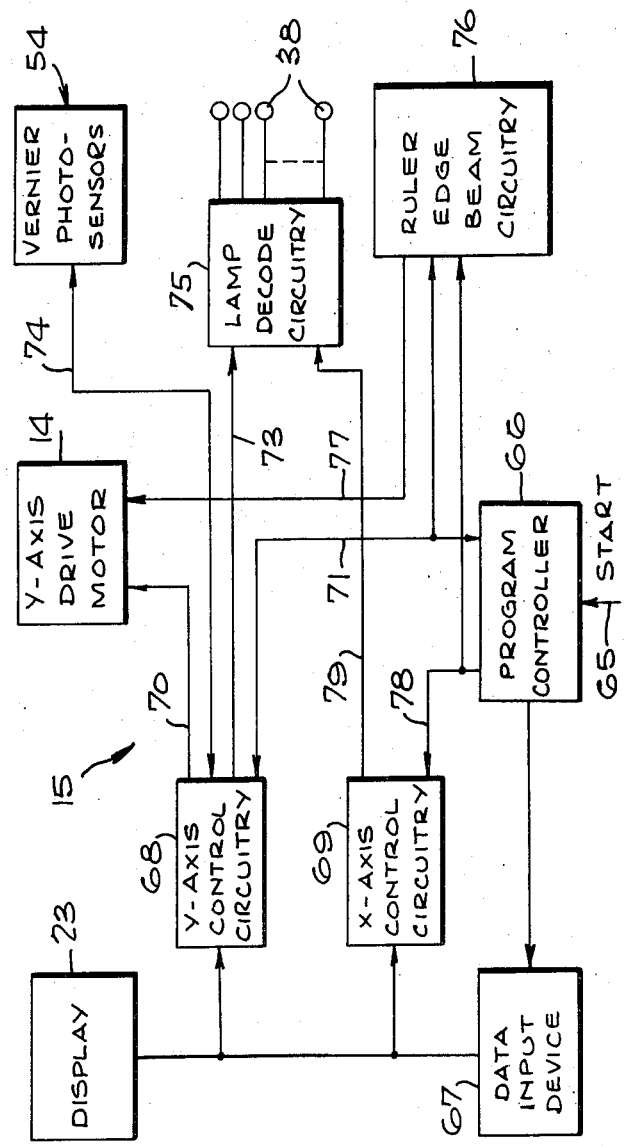

WIRE WRAP PIN POINTERNONE

BACKGROUND OF THE INVENTION

1. Field of the Invention

The present invention relates to an apparatus for pointing to a specific wire wrap terminal board pin. More particularly, the invention relates to a pointer including a ruled reference carriage driven to a selected coordinate along a first axis, and selectively illuminable optical pointers along a ruler edge of the carriage to indicate a selected coordinate along a second axis.

2. Description of the Prior Art

Wire wrapping has to a considerable degree replaced soldering as a technique for attaching wires to selected pins of a terminal board. Wire wrap terminal boards generally include a large number of pins arranged in a matrix of rows and columns. The pins are interconnected in accordance with a wiring plan specifying the row and column coordinates of each pair of pins to be wired together. An operator locates each desired pin position either by counting rows and columns of terminals on the board, or by reference to row and column numbers printed on the terminal board or affixed to rulers mounted along the terminal board edges. A hand held wrapping gun then is used to connect the wire to the located terminal. The process is repeated for each connection.

Such manual wire wrap operation is susceptible to error. Even minor operator carelessness can result in a wire being connected to the wrong terminal pin; the error may take hours of test time to locate. The pin locating problem is particularly acute because of the close spacing between adjacent pins. Typical terminal boards have the pins arranged with 0.100 inch or 0.156 inch center-to-center spacing along each axis.

Several approaches have been suggested in the past for accurately positioning wire wrap tools. Completely automatic operation is achieved using complex equipments in which the terminal board is mounted on a bed automatically positioned along two axes beneath a machine actuated wire wrap tool. In other fully automated systems, a pair of wire wrap tools are independently, simultaneously positioned above the two pins to be wired together. The tools are situated over the pins, lowered to perform the wrapping, and readied for the next wire connection all under computer control. While such systems provide accurate wire wrap interconnection, the equipment is complex and very high in cost. Use of such systems is economical only for large production jobs.

For wire wrap applications where fully automated systems are not economical, other devices have been suggested for aiding an operator to locate correctly a hand held wire wrap gun. For example, the U.S. Pat. No. 3,523,353 to Drinkard et al. shows a back plane wiring apparatus including a planograph assembly having a stylus which is positioned by the operator on a template specifying the desired wiring interconnections. The resultant motion of the planograph locates a target hole adapter member over the corresponding pin on the terminal board being wired. The operator then places the wire wrap gun through the target hole adapter member to effectuate wrapping of the correct pin.

Devices of the type just described facilitate accurate gun positioning, but have the disadvantage that a stylus must be manually positioned on a template for each pin connection. This operation itself is tedious, and does not facilitate positioning directly from the wiring plan. It would be more advantageous to provide a pin pointer which receives as an input the wiring plan itself, read in via a keyboard or a coded tape.

An alternative approach of the prior art, illustrated by the U.S. Pat. No. 3,327,374 to Lulick et al. involves interconnecting the terminal board to a prewired master board. The hand held wire wrap tool is provided with a metallic tip in electrical circuit with an indicator lamp. When the operator touches the pin to be wired, the lamp goes on indicating to the operator that the gun is correctly positioned. Use of such tool still requires the operator to locate the pin manually, the lamp system serving only to verify that the pin has been correctly identified.

Thus there has not been available in the prior art a relatively simple and inexpensive apparatus capable of pointing to a selected wire wrap terminal pin specified, e.g., by a preprogrammed tape. It is an object of the present invention to provide such an apparatus. The inventive wire wrap pin pointer uniquely indicates the pin to be wrapped. Further, the apparatus includes means for sensing and confirming to the operator that the tool has in fact been correctly located, so that even an unskilled operator can unambiguously, correctly position the wire wrap gun.

SUMMARY OF THE INVENTION

The inventive electromechanical wire wrap pin pointer incorporates a ruled reference carriage which is mechanically driven along a first axis to align a ruler edge of the carriage with the terminal board row containing the pin to be wrapped. Equally spaced along the ruler edge are a plurality of illuminable optical pointers, each comprising a lamp and an optical guide. After the carriage has stopped at the correct row, the appropriate optical pointer is lighted to point to the specific pin to be wrapped.

To insure that the operator correctly places the gun in the indicated row, a light beam is projected parallel to, and immediately in front of the carriage ruler edge. When the wire wrap gun is placed in the correct row, the light beam is broken, causing the control mechanism to move the reference carriage back by one row of terminal pins. This back-up action tells the operator that the gun is correctly row-positioned, and also moves the carriage ruler edge sufficiently out of the way so that the optical pointers will not be damaged by the wire wrap gun.

As another feature of the invention, the same optical pointer lamps also are utilized for positioning the carriage along the first axis. To accomplish this, a photo-optical vernier mounted within the carriage moves along the row of lamps through a distance proportional to the carriage travel along the one axis. Appropriate control circuitry energizes a selected lamp and initiates motion of the carriage. When a preselected photosensor in the vernier coincides in position with and senses light from the energized lamp, the carriage drive motor is stopped; the carriage then is situated accurately along the first axis.

BRIEF DESCRIPTION OF THE DRAWINGS

A detailed description of the invention will be made with reference to the accompanying drawings, wherein like numerals designate like components in the several figures.

FIG. 6 is a diagram illustrating operation of the photo-optical vernier during positioning of the carriage along the Y-axis.

FIG. 7 is an electrical block diagram of control circuitry utilized with the inventive pin pointer.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
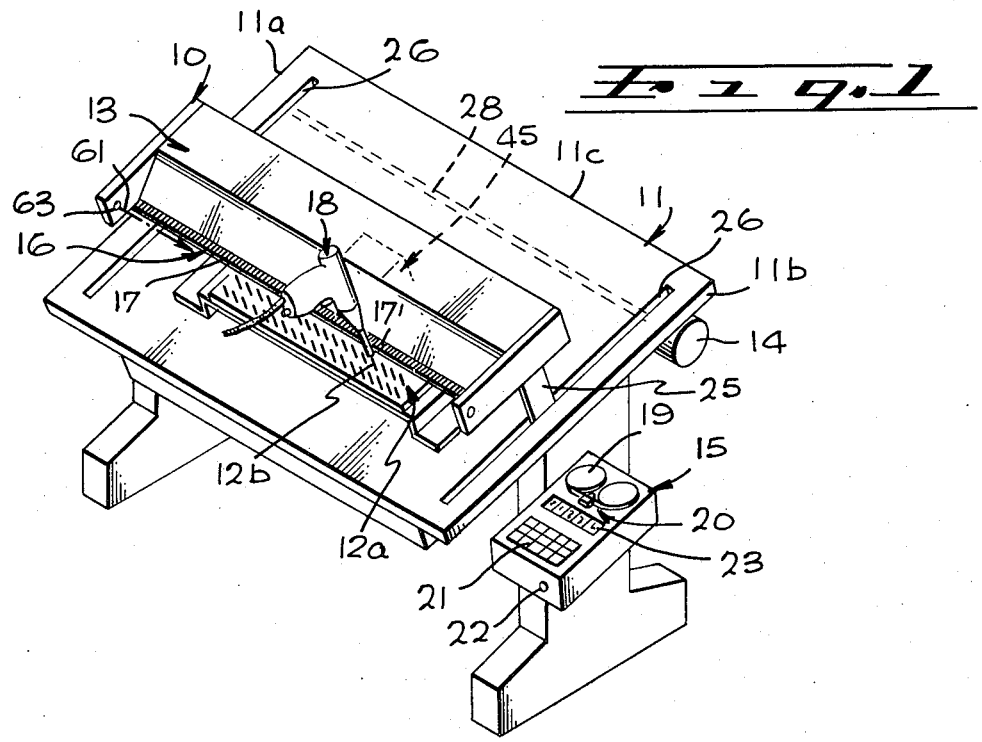
FIG. 1 is a perspective view of the inventive wire wrap pin pointer mounted on a table supporting a terminal board to be wired.

Referring now to the drawings, and particularly to FIG. 1 thereof, the inventive wire wrap pin pointer 10 is shown mounted on a table 11 which supports in a prealigned location the terminal board 12 being wired. The pin pointer 10 includes a ruled reference carriage 13 which is driven parallel to the table side edges 11a, 11b by a motor 14.

Appropriate control circuitry 15, described in conjunction with FIG. 6 below, directs the motor 14 to drive the carriage 13 until the carriage ruler edge 16 is aligned with the row 12a of terminals containing the pin 12b to be wrapped. The ruler edge 16 contains a plurality of equally spaced optical pointers 17. As soon as the carriage 13 is row-aligned, a single optical pointer 17′ is illuminated, identifying the specific pin 12b. The operator then readily can locate the wire wrap gun 18 at the correct pin 12b.

The terminal board 12 is wired in accordance with a wiring list specifying each pair of pins to be interconnected. This wiring list may be prerecorded in digital form on a magnetic or punched paper tape 19 read by a tape reader 20 cooperating with control circuitry 15. Alternatively, a keyboard 21 may be used to read in the pin coordinates. To initiate an operating cycle, the operator depresses a switch 22 which causes read in, as from the tape 19, of the row and column coordinates of the next pin to be wrapped; these coordinates may be shown numerically on a display 23.

The control circuitry 15 first positions the carriage 13 along the Y-axis. To facilitate such positioning, the carriage 13 is supported by a pair of legs 25 which extend through slots 26 in the table 11 parallel to the edges 11a, 11b. At the lower end of one leg 25 is a threaded cylindrical member 25a (FIG. 3) through which extends a screw shaft 27 driven by the motor 14 via a drive shaft 28, shown in phantom in FIG. 1, and a set of right angle bevel gears 29.

Figure 2:
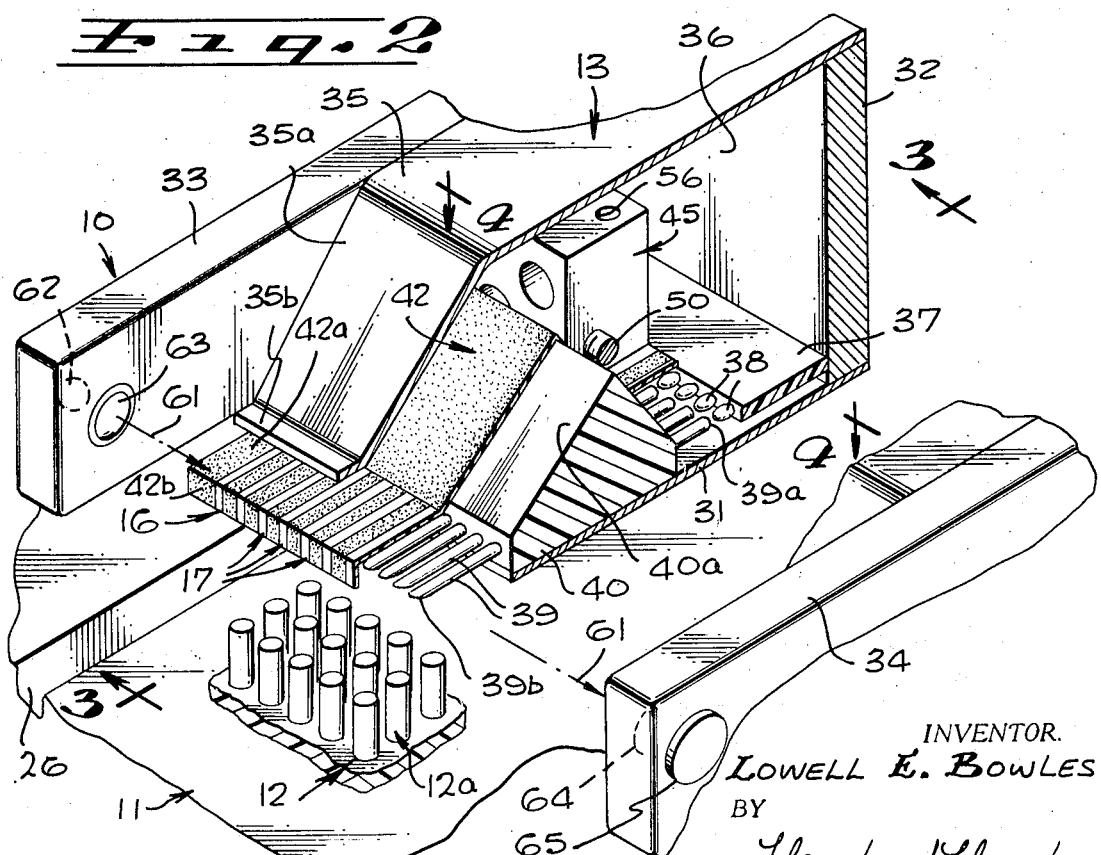
FIG. 2 is a fragmentary pictorial view, partly broken away and in section, showing details of the pin pointer ruled reference carriage.
Figure 3:
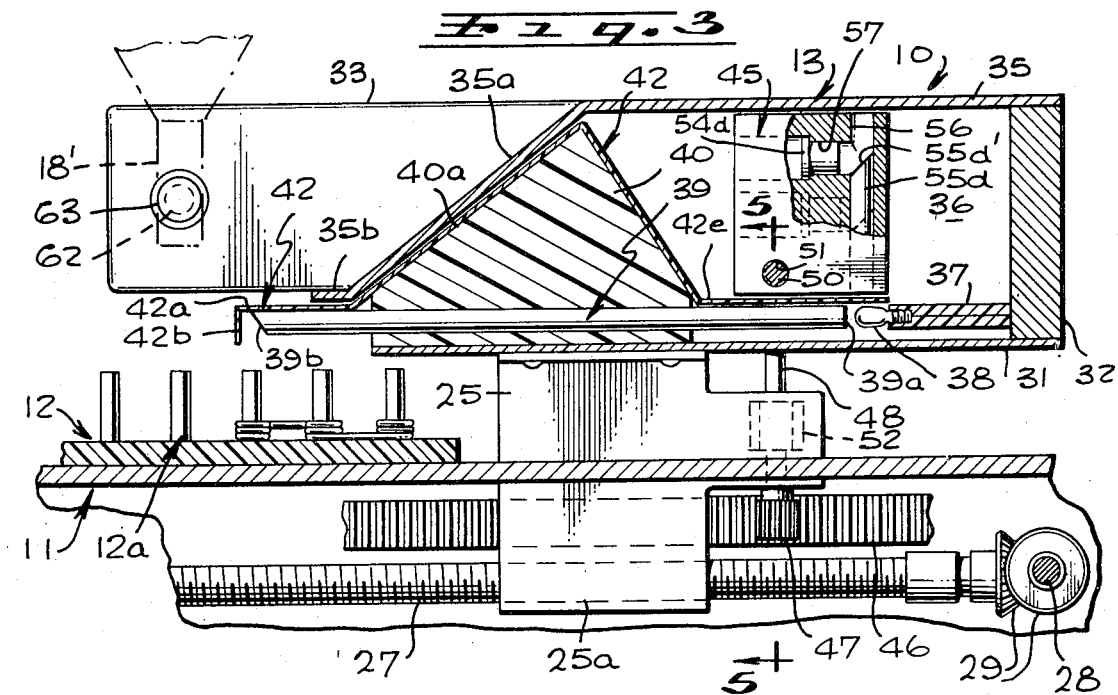
FIG. 3 is a side view, partly in section, of the pin pointer carriage and Y-axis drive components, as seen generally along the line 3—3 of FIG. 2.
Figure 4:
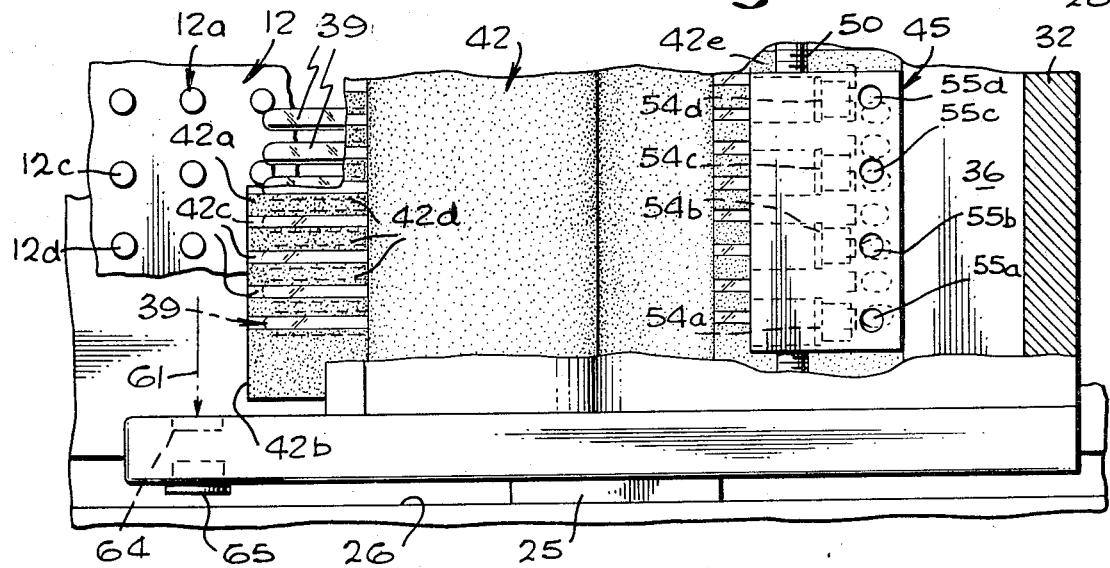
FIG. 4 is a fragmentary top plan view, as seen generally along the line 4—4 of FIG. 2, showing details of the optical guides and the photo-optical vernier.

Details of the carriage 13 and the optical pointers 17 are shown in FIGS. 2, 3, and 4. The carriage 13 includes a base plate 31 and a back plate 32 which extend between a pair of end members 33, 34. A cover plate 35 having a downwardly inclined front portion 35a and a horizontal front lip 35b completes the carriage 13 housing and defines an interior chamber 36.

Situated within the chamber 36 and supported by the base plate 31 is a mounting board 37 to the front edge of which are attached a plurality of lamps 38. Associated with each lamp is an optical guide 39 typically comprising a transparent plastic rod having a diameter on the order of 60 to 80 mils. Each guide 39 includes a flat rear end 39a facing a corresponding lamp 38, and a front end 39b which is slanted to defuse and upwardly reflect light transmitted through the guide 39 from the lamp 38. The optical guides 39 pass through and are secured in place by a molded or laminated plastic block 40 having an inclined upper surface 40a. When a single lamp 38 is turned on, the light will be transmitted through only one of the optical guides 39 to the corresponding pin. Opaque separators (not shown) may be mounted between adjacent lamps 38 to prevent light from each lamp from entering any but the associated optical guide 39.

The center-to-center spacing between optical guides 39 preferably corresponds to the like spacing between adjacent pins in each row of the terminal board 12. Thus, e.g., if two adjacent pins 12c, 12d (FIG. 4) are separated by 100 mils, then adjacent optical guides 39 likewise have 100 mils center-to-center spacing.

A photographic mask 42 is used to provide improved definition for light transmitted by the guides 39. The mask 42 is clamped between the block 40 and the cover inclined portion 35a (FIGS. 2 and 3), and horizontal section 42a covering the optical guide portions 39c extending in front of the block 40. The mask forward end 42b is folded downwardly to define the ruler edge 16. The mask 42 is opaque, but has a plurality of transparent slots 42c extending along the respective optical guides 39.

Preferably, the transparent slots 42c are narrower than the diameter of the optical guides 39. For example, the slots 42c each may be 30 mils wide, the intermediate opaque regions 42d (FIG. 4) each being 70 mils wide. This provides 100 mils center-to-center spacing between adjacent transparent slots 42c, corresponding exactly to the between-pin spacing of the terminal board 12.

Thus, each optical pointer 17 includes a lamp 38, the corresponding optical guide 39, and the corresponding transparent slot 42c in the mask 42. With this arrangement, the light from a single lamp 38 is visible to the operator only through a single slot 42c pointing to the pin 12b to be wrapped. Note that if a system 10 having 100 mil pointer spacing is used with a terminal board (not shown) having 156 mils pin spacing, two adjacent lamps 38 could be turned on. The terminal board pin to be wrapped then would be situated between the adjacent illuminated slots 42c.

Figure 5:
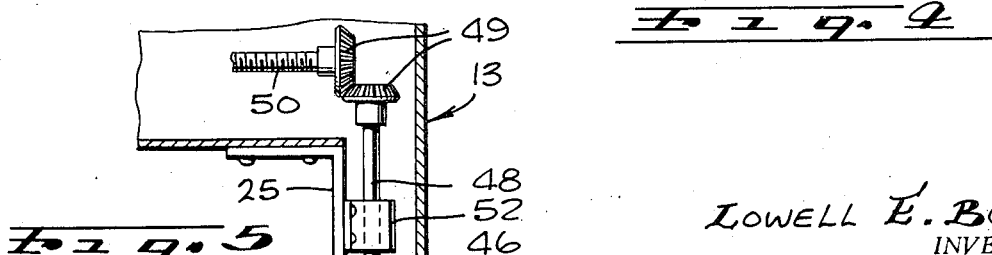
FIG. 5 is a fragmentary side elevation view showing details of the vernier drive mechanism, as seen generally along the line 5—5 of FIG. 3.

The lamps 38 also may be used to control positioning of the carriage 13 along the Y-axis. Accordingly, a photo-optical vernier 45 within the chamber 36 is moved along the carriage 13 in proportion to travel of the carriage 13 along the table 11. To facilitate such motion, a rack gear 46 (FIGS. 3 and 5) is affixed to the table 11. A pinion gear 47 engages the rack 46 and is coupled via a shaft 48 and a set of right angle bevel gears 49 to a screw shaft 50 extending longitudinally within the chamber 36 and engaging a threaded hole 51 through the vernier 45. The shaft 48 is journaled to a bearing 52 on the carriage leg 25.

With this arrangement, as the motor 14 drives the carriage 13 parallel to the table edges 11a, 11b, the rack and pinion gears 46, 47 cooperate with the threaded shaft 50 to drive the vernier 45 a proportional distance along the X-axis. For example (FIG. 6), when the carriage 13 travels a distance $x$ along the Y-axis, equal to the between row spacing of the terminal board 12, the vernier 45 will move a distance $x/4$ along the X-axis.

Within the photo-optical vernier 45 are four photosensors 54a, 54b, 54c and 54d (collectively designated photosensors 54) which respectively receive light from the lamps 38 via four vertical optical guides 55a, 55b, 55c and 55d (herein, guides 55). The typical guide 55d is situated in a vertical hole 56 through the vernier 45 and includes a slanted upper end 55d' which reflect light to the associated photosensor 54d mounted in a horizontal opening 57 in the vernier 45. The other photosensors 54 and guides 55 are similarly mounted. The rear edge 42e of the mask 42 is situated between the lamps 38 and the vernier 42 and contains translucent slots aligned with the lamps 38 to insure that light from the illuminated lamp enters only one of the guides 55.

The center-to-center spacing between adjacent optical guides 55 is determined by the number $n$ of photosensors 54 in the vernier 45, the spacing between the lamps 38 (herein equal to $x$, the between-row or between-column pin spacing) and the proportional distance travelled by the vernier 45 in response to motion of the carriage 13. By way of example, the illustrated photo-optical vernier 45 includes four photosensors 54 with a spacing of 225 mils. In general, the proportional distance travelled by the vernier 45 is $x/n$, and the guide 55 spacing is $Nx + x/n$ where N is an integer.

With this arrangement, for each terminal board 12 row aligned position of the carriage 13, there is a unique coincidence between one lamp 38 and one photosensor 54. Thus by energizing the appropriate lamp 38 and photosensor 54, and driving the carriage 13 and the vernier 45 until such coincidence occurs, the desired Y-axis positioning will be achieved. This is illustrated in FIG. 6. To position the carriage 13 at terminal board row A, the lamp 38a is turned on and the carriage 13 driven until the photosensor 54a is aligned with, and detects light from the lamp 38a. If the carriage 13 then is to be moved to row B, the lamp 38b is lit, and the photosensor 54b is enabled. When coincidence between the lamp 38b and the photosensor 54d occurs, the carriage 13 is at the desired Y-axis coordinate.

Preferably the wiring list tape 19 (FIG. 1) is programmed so that all wiring is done from the front to the rear of the board 12. Thus, after the first end of each wire is wrapped to a particular pin, the carriage 13 will move toward the table rear edge 11c, thereby preventing the ruler edge 16 from striking the wire being wrapped.

Nevertheless, to insure that the ruler edge 16 does not strike either the tool 18 or a wire projecting up from the terminal board 12, a tool or wire sensing light beam (see the arrow 61 in FIGS. 1 and 2) is projected along and in front of the ruler edge 16. The light beam 61 is produced by a lamp 62 and lens 63 situated in the carriage end member 33. The beam is detected by a lens 64 and a photosensor 65 situated in the other carriage end member 34. The beam 61 is so spaced as to be directly above and in line with the terminal board row 12a with which the carriage 13 is aligned.

Appropriate circuitry is provided so that if the beam of light 61 is interrupted while the carriage 13 is moving, the motor 14 immediately will be shut off. Thus, if a wire (not shown) is projecting upward from the terminal board 12 which might otherwise injure the ruler edge 16, the wire will interrupt the beam 61 and stop the carriage 13 prior to any physical contact with the wire.

The light beam 61 also plays a roll in confirming to the operator that the wire wrap gun 18 has been placed in the proper row after the optical pointer 17 has indicated the pin 12b to be wrapped. When the wire wrap gun 18 is lowered toward the terminal board row 12a, as shown in phantom at 18' in FIG. 3, the light beam 61 will be broken. Appropriate circuitry then will cause the carriage 13 to move backward toward the table rear edge 11c by a distance equal to one row of the terminal board 12. This back-up of the carriage 13 informs the operator that the wire wrap gun 18 has been placed in the correct row, and also moves the ruler edge 16 sufficiently far out of the way so as to prevent damage by the gun 18.

FIG. 7 shows exemplary circuitry which may be employed to direct operation of the wire wrap pin pointer 10. Referring thereto, program operation is initiated when the switch 22 is depressed, providing a start signal along a line 65 to a program controller 66. In response to the start signal, the program controller 66 enables a data input device 67 which may comprise either the tape reader 20 or the keyboard 21 mentioned in conjunction with FIG. 1. The X and Y coordinates of the next pin to be wire wrapped are supplied from the data input device 67 to the display 23, to the Y-axis control circuitry 68 and to the X-axis control circuitry 69.

The program controller 66 also provides an enable signal via a line 71 to the Y-axis control circuitry 68. In turn, the control circuitry 68 sends a start signal via a line 70 to the drive motor 14, initiating travel in the appropriate direction of the carriage 13. The control circuitry 68 enables via the lines 73, 74 and the lamp decode circuitry 75 the unique lamp 38 and photosensor 54 combination corresponding to Y-axis coordinate specified from the data input device 67.

The carriage 13 is driven by the motor 14 until the enabled photosensor 54 coincides with the illuminated lamp 38, at which time a photosensor output signal is sent back to the Y-axis control circuitry 68 via a line 74. Occurrence of this signal causes the control circuitry 68 to turn off the drive motor 14, the carriage 13 then being correctly positioned.

The Y-axis enable signal on the line 71 also is provided to appropriate ruler edge beam circuitry 76 which cooperates with the beam 61 (FIGS. 1 and 2) to detect the presence of a wire or other impediment in the path of the moving carriage 13. If such an item is detected, the ruler edge beam circuitry immediately will send a stop signal via a line 77 to the drive motor 14, halting the carriage 13.

When the carriage 13 has been positioned along the Y-axis, the control circuitry 68 returns an acknowledge signal via the line 71 to the program controller 66. The program controller 66 subsequently sends an enable signal via a line 78 to the X-axis control circuitry 69. This control circuitry 69 enables via a line 79 and the lamp decode circuitry 75 the lamp 38 corresponding to the X-axis coordinate supplied by the data input device 67. This lamp 38 illuminates the designated optical pointer 17'. The signal on the line 78 also places the ruler edge beam circuitry 76 into the mode of operation used to detect proper placement of the tool 18. Accordingly, when the wire wrap gun 18' interrupts the beam 61 (FIG. 3), the circuitry 76 provides appropriate signals via the line 77 to cause the Y-axis drive motor 14 to back up the carriage 13 by a preselected distance. This confirms to the operator that the wire wrap gun 18 has been correctly positioned, and completes operation of the pin pointer 10 cycle. The next cycle may be started automatically, or by subsequent depression of the push button 22.

Thus there is provided a novel apparatus uniquely, mechanically and optically pointing to a position specified by two-dimensional coordinates supplied to the apparatus. Although illustrated in a wire wrap terminal pointing application, the apparatus is not so limited, and can be used for any position specifying application.

Intending to claim all novel, useful and unobvious features shown or described, the applicant claims 1. Apparatus for pointing to a selected location, comprising:
   a ruled reference carriage adapted to move along a first axis,
   means for moving said carriage along said first axis to a first coordinate of said selected location,
   a plurality of individually illuminable optical pointers aligned along a ruler edge of said reference carriage, and
   means for illuminating one or more of said pointers to identify a second coordinate of said selected location.

2. Apparatus according to claim 1 wherein each optical pointer comprises a lamp and optical guide means for conducting light from the corresponding lamp to said ruler edge.

3. Apparatus according to claim 2 wherein said ruler edge is perpendicular to said first axis.

4. Apparatus according to claim 2 further comprising a mask covering the ends of said guide means and defining said ruler edge, said mask including a like plurality of equally spaced translucent slots along said ruler edge, light from an illuminated lamp being evident only through the translucent slot of the corresponding optical pointer.

5. Apparatus according to claim 2 wherein said means for illuminating includes decode circuitry for energizing the lamp associated with said second coordinate.

6. Apparatus according to claim 2 further comprising a photo-optical vernier adapted to move along said carriage parallel to said ruler edge in correspondence with movement of said carriage along said first axis, said vernier including photosensor means responsive to light from said lamps, control means for lighting one of said lamps to specify said first coordinate, and means for initiating movement of said carriage along said first axis and for stopping such movement when said vernier photosensor means detects the light from said coordinate specifying lamp.

7. Apparatus according to claim 6 wherein said photosensor means comprises $n$ photosensors and wherein said vernier moves a distance $x/n$ along said carriage as said carriage moves a distance $x$ along said first axis.

8. Apparatus according to claim 7 wherein said photosensors effectively are spaced apart by a distance of $Nx + x/n$, wherein $N$ is an integer.

9. Apparatus according to claim 7 wherein said vernier is moved along said carriage by a screw shaft geared to rotate as said carriage is moved along said first axis.

10. Apparatus according to claim 7 wherein said control means enables only a specific one of said $n$ photosensors, movement of said carriage stopping when said enabled photosensor detects the light from said coordinate specifying lamp.

11. Apparatus according to claim 10 wherein said control means functions and said carriage is positioned along said first axis prior to actuation of said means for illuminating.

12. Apparatus according to claim 1 further comprising a light source at one end of said carriage for providing a beam of light parallel to but spaced from said ruler edge, a photodetector at the other end of said carriage for detecting interruption of said light beam, and circuitry connected to said photodetector for controlling motion of said carriage in response to detected interruption of said light beam.

13. Apparatus according to claim 12 wherein said circuitry functions to stop said carriage in response to interruption of said beam of light as said carriage is being moved along said first axis.

14. Apparatus according to claim 12 wherein said circuitry is operative, after said carriage has been positioned along said first axis, to displace said carriage by a preselected distance in response to interruption of said light beam.

15. A pin pointer for use with a terminal board having a matrix of pins and intended to be interconnected by wires wrapped to said pins, comprising:
   a ruled reference carriage adapted for alignment with a selected row of pins on said terminal board, and
   a plurality of optical pointers disposed along a ruler edge of said carriage and selectively illuminable to specify a pin in said selected row.

16. A pin pointer according to claim 15 wherein each optical pointer comprises a lamp and an optical guide extending and transmitting light from said lamp to said ruler edge.

17. A pin pointer according to claim 16 wherein the center-to-center spacing between adjacent optical guides corresponding to the pin spacing in a row of said terminal board.

18. A pin pointer according to claim 16 wherein each optical guide comprises a plastic rod, and further comprising a mask covering said rods and defining said ruler edge, said mask having translucent slots in alignment with said rods, light from an illuminated lamp being evident only through the corresponding mask slot.

19. A pin pointer according to claim 18 wherein said plastic rods are partly embedded in a block, said block being affixed to said carriage.

20. A pin pointer according to claim 15 wherein said carriage is mounted above a table supporting said terminal board, and further comprising drive means for moving said carriage across said table into alignment with said selected row of pins.

21. A pin pointer according to claim 20 wherein said carriage is supported on legs, and wherein said drive means comprises a drive motor and Y-axis control circuitry for causing said drive motor to move said carriage to a Y-axis coordinate identifying said selected row.

22. A pin pointer according to claim 21 wherein each optical pointer includes a lamp, and further comprising a photo-optical vernier driven along said carriage in unison with movement of said carriage, said vernier including one or more photosensors responsive to light from said lamps, said Y-axis control circuitry directing movement of said carriage until an enabled photosensor detects light from one of said lamps, said enabled photosensor and said one lamp together being uniquely associated with the coordinate of said selected row.

23. A pin pointer according to claim 15 further comprising a light source at one end of said carriage for projecting a light beam in front of said ruler edge and above said selected row of pins, placement of a wire wrap tool in the selected row of pins causing interruption of said light beam, and means including a photodetector at the other end of said carriage for indicating by detection of such interruption that correct row placement of said tool has occurred.

24. A system for positioning a movable carriage to a selected coordinate along the axis of movement, comprising
a row of equally spaced lamps mounted on said carriage,
a housing mounted on said carriage and adapted to be driven along said row of lamps in response to movement of said carriage along said axis, said housing containing one or more photosensors, and
means for driving said carriage along said axis and for stopping said carriage when an enabled one of said photosensors detects light from an illuminated one of said lamps, said enabled photosensor and said one lamp together uniquely specifying said selected coordinate.

* * * * *